US010814696B2

(12) United States Patent
Tominaga et al.

(10) Patent No.: US 10,814,696 B2
(45) Date of Patent: Oct. 27, 2020

(54) HEAT EXCHANGE SYSTEM FOR VEHICLE

(71) Applicant: TOYOTA JIDOSHA KABUSHIKI KAISHA, Toyota-shi, Aichi-ken (JP)

(72) Inventors: Satoshi Tominaga, Susono (JP);
Daisuke Tokozakura, Susono (JP);
Hideki Kubonoya, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 77 days.

(21) Appl. No.: 16/124,812

(22) Filed: Sep. 7, 2018

(65) Prior Publication Data
US 2019/0084373 A1 Mar. 21, 2019

(30) Foreign Application Priority Data

Sep. 15, 2017 (JP) .................. 2017-178363

(51) Int. Cl.
| B60H 1/00 | (2006.01) |
| B60H 1/32 | (2006.01) |
| F25B 41/06 | (2006.01) |
| F25B 6/00 | (2006.01) |
| B60H 1/14 | (2006.01) |
| F16H 57/04 | (2010.01) |
| F25B 31/00 | (2006.01) |

(52) U.S. Cl.
CPC ......... *B60H 1/00914* (2013.01); *B60H 1/004* (2013.01); *B60H 1/00921* (2013.01); *B60H 1/14* (2013.01); *B60H 1/143* (2013.01); *B60H 1/3213* (2013.01); *F16H 57/0413* (2013.01); *F25B 6/00* (2013.01); *F25B 41/062* (2013.01); *B60H 1/00485* (2013.01); *B60H 2001/00307* (2013.01); *B60H 2001/00928* (2013.01); *B60H 2001/00949* (2013.01); *F25B 31/002* (2013.01)

(58) Field of Classification Search
CPC ............... B60H 1/00914; B60H 1/004; B60H 1/00921; B60H 1/14; B60H 1/143; B60H 1/3213; B60H 1/00485; B60H 2001/00307; B60H 2001/00928; B60H 2001/00949; F16H 57/0413; F25B 6/00; F25B 41/062; F25B 31/002
USPC .......................................... 62/132
See application file for complete search history.

(56) References Cited

U.S. PATENT DOCUMENTS

| 9,533,544 B2 | 1/2017 | Johnston |
| 2011/0139397 A1 | 6/2011 | Haussmann |

(Continued)

FOREIGN PATENT DOCUMENTS

| CN | 107000543 A | 8/2017 |
| CN | 107074094 A | 8/2017 |

(Continued)

*Primary Examiner* — Joel M Attey
(74) *Attorney, Agent, or Firm* — Finnegan, Henderson, Farabow, Garrett & Dunner, LLP

(57) ABSTRACT

A heat exchange system for a vehicle including a battery, an electric motor, and a transmission system is provided. The heat exchange system includes a heat pump, and a heat exchanger. The heat pump is used for air conditioning. The heat pump includes an electric compressor that compresses a refrigerant. The electric compressor is configured to be driven with electric power from the battery. The heat exchanger is configured to exchange heat between the refrigerant and lubricating oil that lubricates the transmission system.

8 Claims, 9 Drawing Sheets

(56) References Cited

U.S. PATENT DOCUMENTS

| | | |
|---|---|---|
| 2012/0222438 A1 | 9/2012 | Osaka et al. |
| 2013/0139531 A1* | 6/2013 | Pohl .................... F16H 57/0412 |
| | | 62/115 |
| 2015/0191072 A1 | 7/2015 | Inoue et al. |
| 2015/0202986 A1 | 7/2015 | Hatakeyama et al. |
| 2015/0239322 A1 | 8/2015 | Yokoo et al. |
| 2015/0295285 A1 | 10/2015 | Takeuchi et al. |
| 2016/0075214 A1* | 3/2016 | Hamamoto ........ B60H 1/00921 |
| | | 62/160 |
| 2016/0107506 A1 | 4/2016 | Johnston |
| 2016/0254730 A1* | 9/2016 | Lassila ..................... B60K 1/00 |
| | | 310/54 |
| 2017/0158081 A1 | 6/2017 | Kim et al. |
| 2017/0282676 A1 | 10/2017 | Janier et al. |
| 2017/0326945 A1 | 11/2017 | Hatakeyama et al. |

FOREIGN PATENT DOCUMENTS

| | | |
|---|---|---|
| EP | 2 977 254 A1 | 1/2016 |
| JP | 03-271518 A | 12/1991 |
| JP | 07-012422 A | 1/1995 |
| JP | 07-076229 A | 3/1995 |
| JP | 2001-354029 A | 12/2001 |
| JP | 2006-290254 A | 10/2006 |
| JP | 2011-068348 | 4/2011 |
| JP | 2014-037178 | 2/2014 |
| JP | 2014-037959 A | 2/2014 |
| JP | 2014-084060 | 5/2014 |
| JP | 2014-095487 A | 5/2014 |
| JP | 2014-196017 A | 10/2014 |
| JP | 2017-105425 | 6/2017 |

* cited by examiner

HEAT EXCHANGE SYSTEM FOR VEHICLE

INCORPORATION BY REFERENCE

The disclosure of Japanese Patent Application No. 2017-178363 filed on Sep. 15, 2017 including the specification, drawings and abstract is incorporated herein by reference in its entirety.

BACKGROUND

1. Technical Field

The present disclosure relates to a heat exchange system for a vehicle.

2. Description of Related Art

Japanese Patent Application Publication No. 2014-084060 (JP 2014-084060 A) discloses a heat exchange system used to perform air-conditioning in a vehicle cabin. In this heat exchange system, air-conditioning in the vehicle cabin is performed by using a heat pump that exchanges heat between the outside and the inside of the vehicle. The heat pump described in JP 2014-084060 A employs an electric compressor to compress a refrigerant and thereby raise the temperature of the refrigerant.

SUMMARY OF THE INVENTION

When the above heat pump is applied to a vehicle having an electric motor as a propulsion power source, part of battery electric power to be supplied to the electric motor is consumed in the electric compressor during the use of air conditioning. When the heat pump is used for air-conditioning in the vehicle cabin, a large workload is required of the electric compressor to meet heating requirements. As the electric power consumption in the electric compressor increases, the amount of battery electric power that can be supplied to the electric motor decreases, which may result in a shorter range of the vehicle.

The present disclosure provides a heat exchange system for a vehicle that can reduce electric power consumption in an electric compressor included in an air-conditioning heat pump and thereby secure battery electric power that can be supplied to an electric motor serving as a propulsion power source.

A first aspect of the present disclosure provides a heat exchange system for a vehicle including a battery, an electric motor as a propulsion power source, and a transmission system. The electric motor is configured to be driven with electric power supplied from a battery. The heat exchange system includes a heat pump and a heat exchanger. The heat pump is used for air conditioning. The heat pump includes an electric compressor that compresses a refrigerant. The electric compressor is configured to be driven with electric power from the battery. The heat exchanger is configured to exchange heat between the refrigerant and lubricating oil that lubricates a transmission system.

This configuration makes it possible to transfer heat from the lubricating oil of the transmission system to the refrigerant of the heat pump. Thus, during heating performed in a vehicle cabin, the workload of the electric compressor in meeting heating requirements can be reduced. As a result, the electric power consumption in the electric compressor can be reduced, so that battery electric power that can be supplied to the electric motor can be secured and the range of the vehicle can be extended.

The vehicle may further include a power control unit configured to convert electric power from the battery into an alternating current and supplies the alternating current to the electric motor. The heat exchange system may further include a cooling circuit through which a coolant for cooling the power control unit circulates. The heat exchanger may be configured to exchange heat among three types of fluids that are the coolant, the lubricating oil, and the refrigerant.

This configuration makes it possible to transfer not only the heat of the lubricating oil of the transmission system, but also the heat of the coolant circulating inside the cooling circuit, to the refrigerant of the heat pump. Thus, the workload of the electric compressor in meeting heating requirements during performing heating in the vehicle cabin can be reduced. Moreover, heat can be exchanged among three types of fluids that are the lubricating oil, the coolant, and the refrigerant by using the single heat exchanger. Thus, a weight reduction and a cost reduction of the entire system can be achieved.

The heat pump may further include a first condenser, a second condenser, a heating expansion valve configured to operate during heating performed in the vehicle cabin, and a cooling expansion valve configured to operate during cooling performed in the vehicle cabin. After flowing out of the electric compressor, the refrigerant may flow through the heating expansion valve, the second condenser, and the cooling expansion valve in this order. The heat exchanger may be disposed on the downstream side of the heating expansion valve but on the upstream side of the second condenser.

This configuration allows the refrigerant in a heat absorption process during heating to be given the heat of the lubricating oil in the heat exchanger before the refrigerant flows into the second condenser. Thus, the refrigerant can be given the heat of the lubricating oil in the heat exchanger in addition to the heat of outside air in the second condenser.

The heat pump may further include a first condenser, a second condenser, a heating expansion valve configured to operate during performing heating in the vehicle cabin, and a cooling expansion valve configured to operate during performing cooling in the vehicle cabin. After flowing out of the electric compressor, the refrigerant may flow through the heating expansion valve, the second condenser, and the cooling expansion valve in this order. The heat exchanger may be disposed on the downstream side of the second condenser but on the upstream side of the cooling expansion valve.

This configuration allows the refrigerant in the heat absorption process during heating to be given the heat of the lubricating oil in the heat exchanger after the refrigerant flows out of the second condenser. Thus, the refrigerant can be given the heat of the lubricating oil in the heat exchanger in addition to the heat of the outside air in the second condenser.

The first condenser may be configured to exchange heat between air inside the vehicle and the refrigerant of the heat pump during heating performed in the vehicle cabin. The second condenser may be configured to exchange heat between the air outside the vehicle and the refrigerant during operation of the heat pump.

The heat pump may further include a bypass passage that bypasses the heat exchanger and a switching valve that opens and closes the bypass passage.

This configuration makes it possible to switch a circulation route of the refrigerant between a route that passes through the heat exchanger and a route that bypasses the heat exchanger.

The switching valve may switch between an open state and a closed state according to whether the bypass passage is to be closed or opened during cooling performed in the vehicle cabin.

This configuration makes it possible to close the bypass passage with the switching valve during cooling, and thereby keep the refrigerant of the heat pump from receiving heat from the lubricating oil in the heat exchanger. Thus, degradation of the cooling efficiency can be avoided.

The electric motor may be housed inside a case that houses the transmission system, and the lubricating oil may cool the electric motor inside the case.

This configuration allows the heat of the lubricating oil warmed by the electric motor to be given to the refrigerant of the heat pump in the heat exchanger. Thus, a larger amount of heat can be given to the refrigerant in the heat exchanger.

A second aspect of the present disclosure provides a heat exchange system for a vehicle including a battery, a power control unit, and an electronic motor as a propulsion power source. The electric motor is configured to be driven with electric power supplied from the battery. The power control unit is configured to convert electric power from the battery into an alternating current and supply the alternating current to the electric motor. The heat exchange system includes a heat pump, a cooling circuit, and a heat exchanger. The heat pump is used for air conditioning. The heat pump includes an electric compressor that compresses a refrigerant. The electric compressor is configured to driven with electric power from the battery. The heat exchanger is configured to exchange heat between the coolant and the refrigerant.

This configuration makes it possible to transfer heat from the coolant of the power control unit to the refrigerant of the heat pump. Thus, during heating performed in the vehicle cabin, the workload of the electric compressor in meeting heating requirements can be reduced. As a result, the electric power consumption in the electric compressor can be reduced, so that the range of the vehicle can be extended.

The present disclosure makes it possible to warm the refrigerant circulating through the air-conditioning heat pump with the heat of the lubricating oil that lubricates the transmission system and the heat of the coolant for cooling the power control unit. Thus, during heating, the heat of the lubricating oil and the coolant can be given to the refrigerant in the heat absorption process, which can reduce the workload of the electric compressor and the electric power consumption in the electric compressor. As a result, electric power that can be supplied to the electric motor can be secured, so that the range of the vehicle can be extended.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Heat exchange systems of a vehicle of embodiments according to the present disclosure will be specifically described below with reference to the drawings.

First Embodiment

Figure 1:
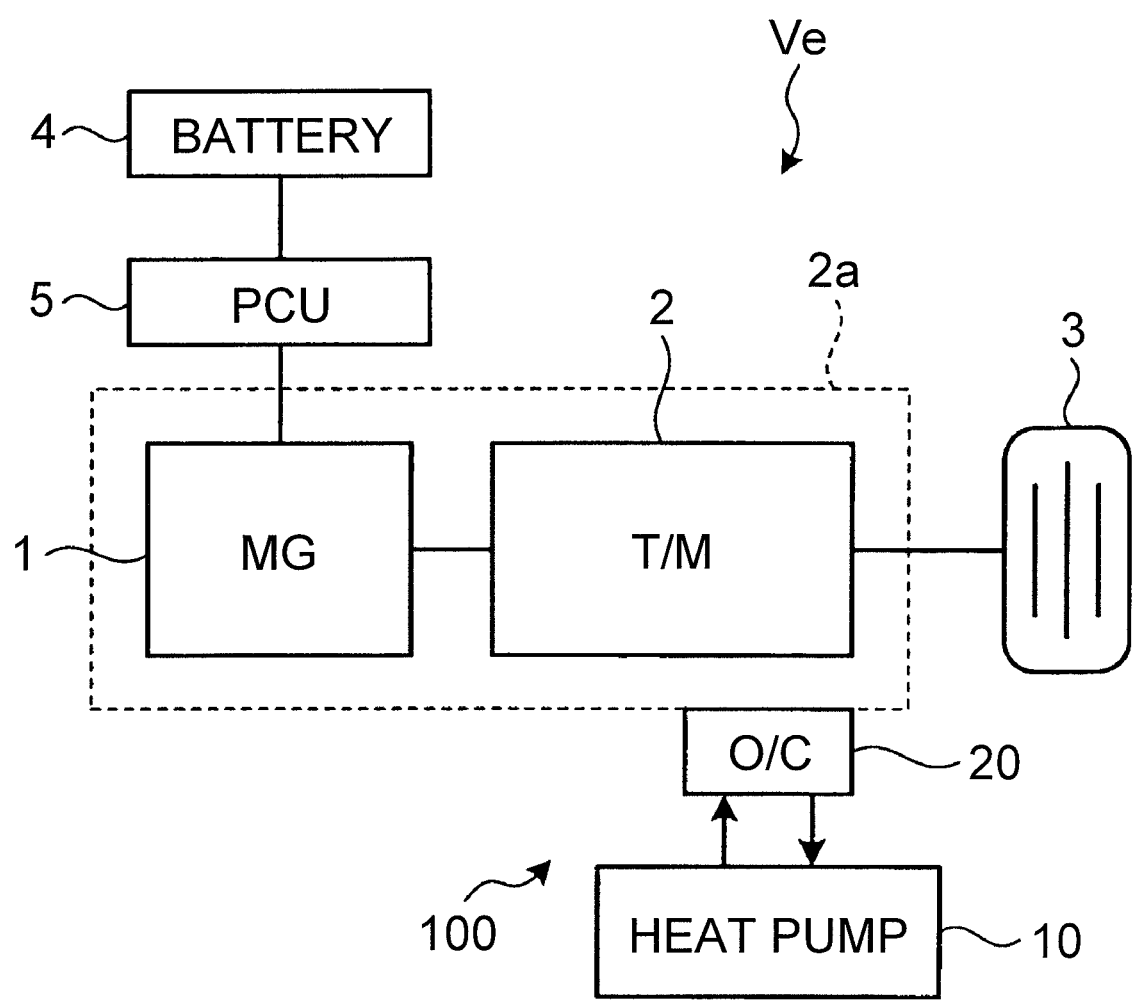
FIG. 1 is a skeleton diagram schematically showing a vehicle equipped with a heat exchange system of a first embodiment.

FIG. 1 is a skeleton diagram schematically showing a vehicle equipped with a heat exchange system 100 of a first embodiment. The heat exchange system 100 is applied to a vehicle Ve equipped with a motor generator (MG) 1 as a propulsion power source. In the vehicle Ve, power output from the motor generator 1 is transmitted to a driving wheel 3 through a transmission system (T/M) 2. The motor generator 1 functions not only as an electric motor that outputs power by consuming electric power from a battery 4, but also as a power generator that converts an external force from the driving wheel 3 into electric power. The battery 4 that stores electric power is electrically connected to the motor generator 1 through a power control unit (PCU) 5 that converts electric power from the battery 4 into an alternating current and supplies this alternating current to the motor generator 1. The battery 4 is charged with electric power to be supplied to a compressor 11 of a heat pump 10, to be described later, as well as to the motor generator 1, and when electric power is supplied to the compressor 11 and the motor generator 1, the state of charge (SOC) decreases. The transmission system 2 includes a transmission and a differential mechanism formed by gear mechanisms. In the example shown in FIG. 1, the motor generator 1 is housed inside a transmission case (hereinafter referred to simply as a "case") 2a that houses the transmission system 2. Lubricating oil that lubricates the transmission system 2 is contained in the case 2a. Thus, the motor generator 1 inside the case 2a can be cooled with the lubricating oil of the transmission system 2. The vehicle Ve in the first embodiment is not limited to a vehicle having only the motor generator 1 as a propulsion power source, for example, an electric vehicle or a fuel cell electric vehicle, but may also be a hybrid electric vehicle having the motor generator 1 and an engine (not shown) as a propulsion power source. The PCU 5 includes a voltage regulation unit such as a booster unit that raises voltages.

The heat exchange system 100 includes the heat pump 10 that is used to perform air-condition in a vehicle cabin, and a heat exchanger 20 that exchanges heat between the lubricating oil of the transmission system 2 and the refrigerant of the heat pump 10. The heat pump 10 heats or cools an air in the vehicle cabin by using a difference in temperature between air outside the vehicle Ve and the air-conditioning refrigerant. The heat exchanger 20 is an oil cooler (O/C)

having a structure that allows circulation of the refrigerant of the heat pump 10 as well as circulation of the lubricating oil of the transmission system 2.

Figure 2:
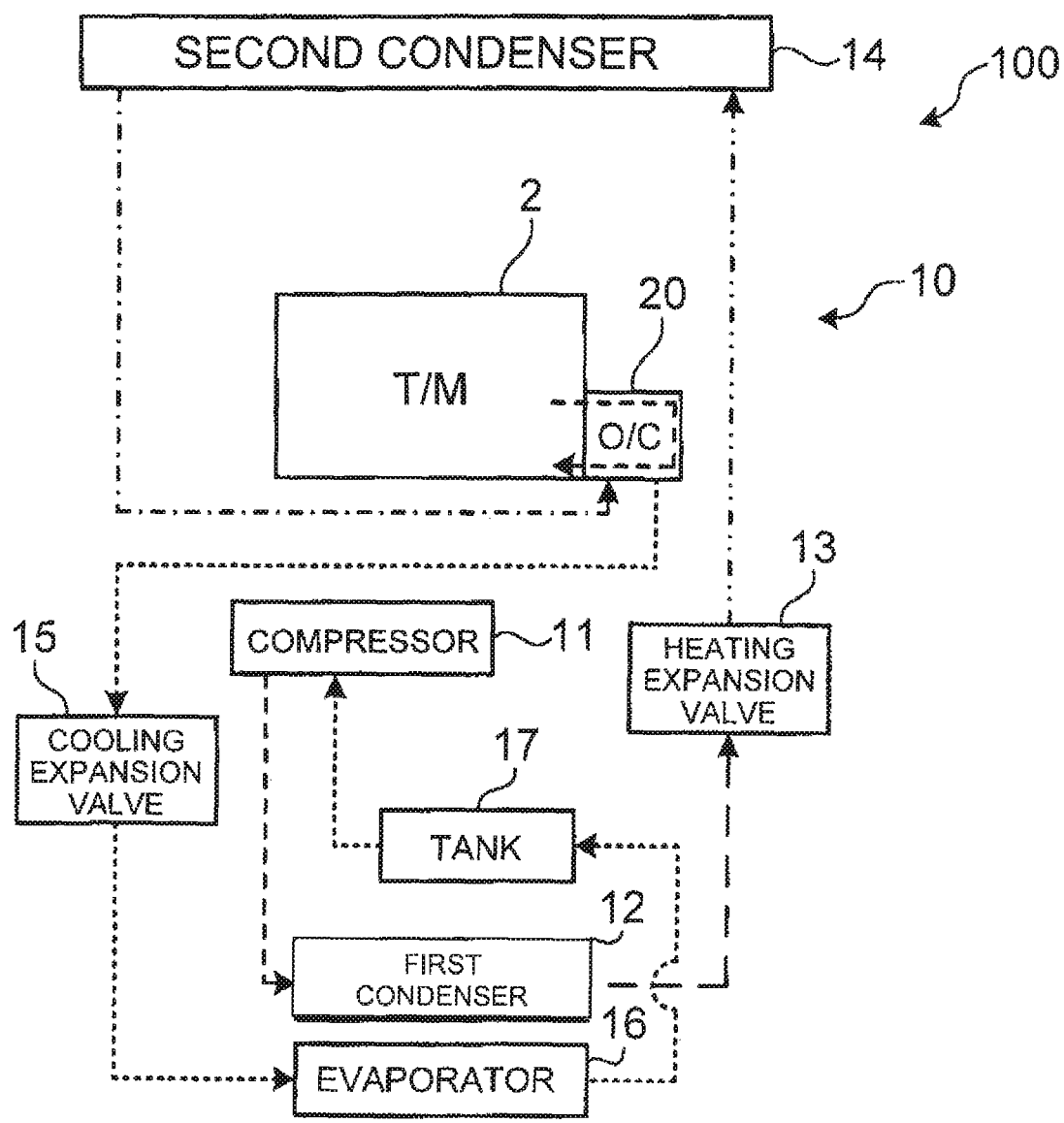
FIG. 2 is a view schematically showing the heat exchange system of the first embodiment.

FIG. 2 is a view schematically showing the heat exchange system 100 of the first embodiment. As shown in FIG. 2, the heat exchange system 100 includes the heat pump 10 configured such that the refrigerant that circulates inside a refrigerant circuit passes through the heat exchanger 20. The heat pump 10 has the compressor 11, a first condenser 12, a heating expansion valve 13, a second condenser 14, the heat exchanger 20, a cooling expansion valve 15, an evaporator 16, and a tank 17. The components included in the heat pump 10 communicate with one another through refrigerant piping (refrigerant passages). In FIG. 2, the refrigerant passages are indicated by the dotted arrows. The refrigerant that circulates during operation of the heat pump 10 flows through the compressor 11, the first condenser 12, the heating expansion valve 13, the second condenser 14, the heat exchanger 20, the cooling expansion valve 15, the evaporator 16, and the tank 17 in this order.

The compressor 11 is an electric compressor that compresses the refrigerant by consuming electric power from the battery 4. Compressing the refrigerant by the compressor 11 can raise the temperature of the refrigerant. The refrigerant compressed in the compressor 11 is supplied to the first condenser 12.

The first condenser 12 is a heat exchanger that exchanges heat between air inside the vehicle and the refrigerant of the heat pump 10 during heating performed in the vehicle cabin. During heating, the heat of the refrigerant flowing inside the first condenser 12 is given to the air inside the vehicle cabin.

During heating performed in the vehicle cabin, the heating expansion valve 13 lowers the temperature of the refrigerant flowing out of the first condenser 12 by expanding (depressurizing) the refrigerant. In the refrigerant circuit of the heat pump 10, the heating expansion valve 13 is disposed between the first condenser 12 and the second condenser 14. During heating, the refrigerant expanded in the heating expansion valve 13 is supplied to the second condenser 14.

The second condenser 14 is a heat exchanger that exchanges heat between the air outside the vehicle Ve and the refrigerant during operation of the heat pump 10. During heating, the heat of the outside air is transferred to the refrigerant flowing inside the second condenser 14 so as to collect the heat of the outside air in the second condenser 14. During cooling, the heat of the refrigerant flowing inside the second condenser 14 is transferred to the outside air so as to release the heat inside the vehicle cabin by the second condenser 14. The refrigerant flowing out of the second condenser 14 is supplied to the heat exchanger 20.

The heat exchanger 20 is disposed between the second condenser 14 and the cooling expansion valve 15, and exchanges heat between the refrigerant flowing on the downstream side of the second condenser 14 and the lubricating oil of the transmission system 2. The temperature of the lubricating oil is higher than the temperature of the refrigerant. During heating, the refrigerant having received heat from the outside air in the second condenser 14 flows inside the heat exchanger 20, and thereby receives heat from the lubricating oil and undergoes a temperature rise. In other words, the lubricating oil of the transmission system 2 is cooled with the refrigerant of the heat pump 10. Thus, with the heat exchanger 20 provided in the route leading from the second condenser 14 to the compressor 11, during heating, the heat of the lubricating oil can be given to the refrigerant having received heat in the second condenser 14.

During cooling performed in the vehicle cabin, the cooling expansion valve 15 lowers the temperature of the refrigerant flowing out of the second condenser 14 by expanding (depressurizing) the refrigerant. In the refrigerant circuit of the heat pump 10, the cooling expansion valve 15 is disposed between the second condenser 14 and the evaporator 16, on the downstream side of the heat exchanger 20 but on the upstream side of the evaporator 16. During cooling, the refrigerant (low-temperature, low-pressure refrigerant) expanded in the cooling expansion valve 15 is supplied to the evaporator 16.

The evaporator 16 is a heat exchanger that exchanges heat between the air inside the vehicle and the refrigerant of the heat pump 10 during cooling performed in the vehicle cabin. During cooling, the refrigerant flowing inside the evaporator 16 receives heat from the air inside the vehicle cabin.

The tank 17 is disposed between the evaporator 16 and the compressor 11, and functions as a storage unit that temporarily stores the refrigerant before reaching the compressor 11. The refrigerant flowing out of the evaporator 16 returns to the compressor 11 via the tank 17.

Here, changes in the temperature and the state of the refrigerant circulating inside the heat pump 10 during heating and those during cooling will be specifically described in detail. Being components that function only during cooling, the cooling expansion valve 15 and the evaporator 16 are not involved in the changes in the temperature and the state of the refrigerant during heating. Being components that function only during heating, the heating expansion valve 13 and the first condenser 12 are not involved in the changes in the temperature and the state of the refrigerant during cooling. Regardless of whether during heating or cooling, the tank 17 is not involved in the changes in the temperature and the state of the refrigerant.

In a reversed Carnot's cycle during heating, the refrigerant is compressed in the compressor 11, releases heat in the first condenser 12, is expanded in the heating expansion valve 13, and absorbs heat in the second condenser 14 and the heat exchanger 20. To look at the refrigerant in the heat absorption process, the refrigerant having received heat from the outside air in the second condenser 14 further receives heat from the lubricating oil in the heat exchanger 20. Thus, the specific enthalpy of the refrigerant at the time of being compressed in the compressor 11 includes not only a gain in the second condenser 14 but also a gain in the heat exchanger 20. As a result, the workload of the compressor 11 can be reduced compared with if the refrigerant absorbs heat only in the second condenser 14. This is because the difference between the specific enthalpy of the refrigerant before being compressed in the compressor 11 and the specific enthalpy of the refrigerant after being compressed in the compressor 11 is reduced by the gain of the specific enthalpy in the heat exchanger 20. The point is that, to reduce the workload of the compressor 11 during heating, it is desirable to increase the amount of heat that the refrigerant can absorb not only from the outside air but also in the heat exchanger 20 relative to the workload of the compressor 11. In the heat exchange system 100, therefore, the heat exchanger 20 is provided in the circulation route leading from the second condenser 14 to the compressor 11.

During cooling, the refrigerant is compressed in the compressor 11, releases heat in the second condenser 14, is expanded in the cooling expansion valve 15, and absorbs heat in the evaporator 16. The refrigerant (high-temperature, high-pressure refrigerant) compressed in the compressor 11 is supplied to the second condenser 14. The refrigerant (medium-temperature, high-pressure refrigerant) cooled in the second condenser 14 flows out of the second condenser 14 and then is expanded in the cooling expansion valve 15. Thus, the low-temperature refrigerant is supplied to the evaporator 16, so that the air in the vehicle cabin can be cooled.

As has been described above, in the first embodiment, the refrigerant in the heat absorption process during heating can not only absorb heat in the second condenser 14 but also receive the heat of the lubricating oil of the transmission system 2, which can increase the amount of heat received by the refrigerant and thereby reduce the workload of the compressor 11. As the workload of the compressor 11 is reduced, the electric power consumption during heating can be reduced, so that battery electric power that can be supplied to the motor generator 1 serving as a power source can be secured and the range of the vehicle Ve can be extended. Since the lubricating oil cools the motor generator 1 inside the case 2a, the heat of the lubricating oil warmed by the motor generator 1 can be given to the refrigerant in the heat exchanger 20. Thus, a larger amount of heat can be exchanged in the heat exchanger 20. Moreover, the lubricating oil can be cooled with the refrigerant in the heat exchanger 20 to lower the temperature of the lubricating oil, which can improve the performance of cooling the motor generator 1 housed inside the case 2a that houses the transmission system 2.

In the heat exchange system 100, the heat exchanger 20 may be disposed on either of the upstream side and the downstream side of the second condenser 14, as long as the refrigerant in the heat absorption process during heating can gain in the specific enthalpy in the heat exchanger 20. However, since the heat pump 10 is a refrigerant circuit including the heating expansion valve 13 and the cooling expansion valve 15, the heat exchanger 20 is disposed on the upstream side of the cooling expansion valve 15 in view of cooling. As a modified example of the first embodiment, a refrigerant circuit in which the heat exchanger 20 is disposed on the upstream side of the second condenser 14 is shown in FIG. 3.

Figure 3:
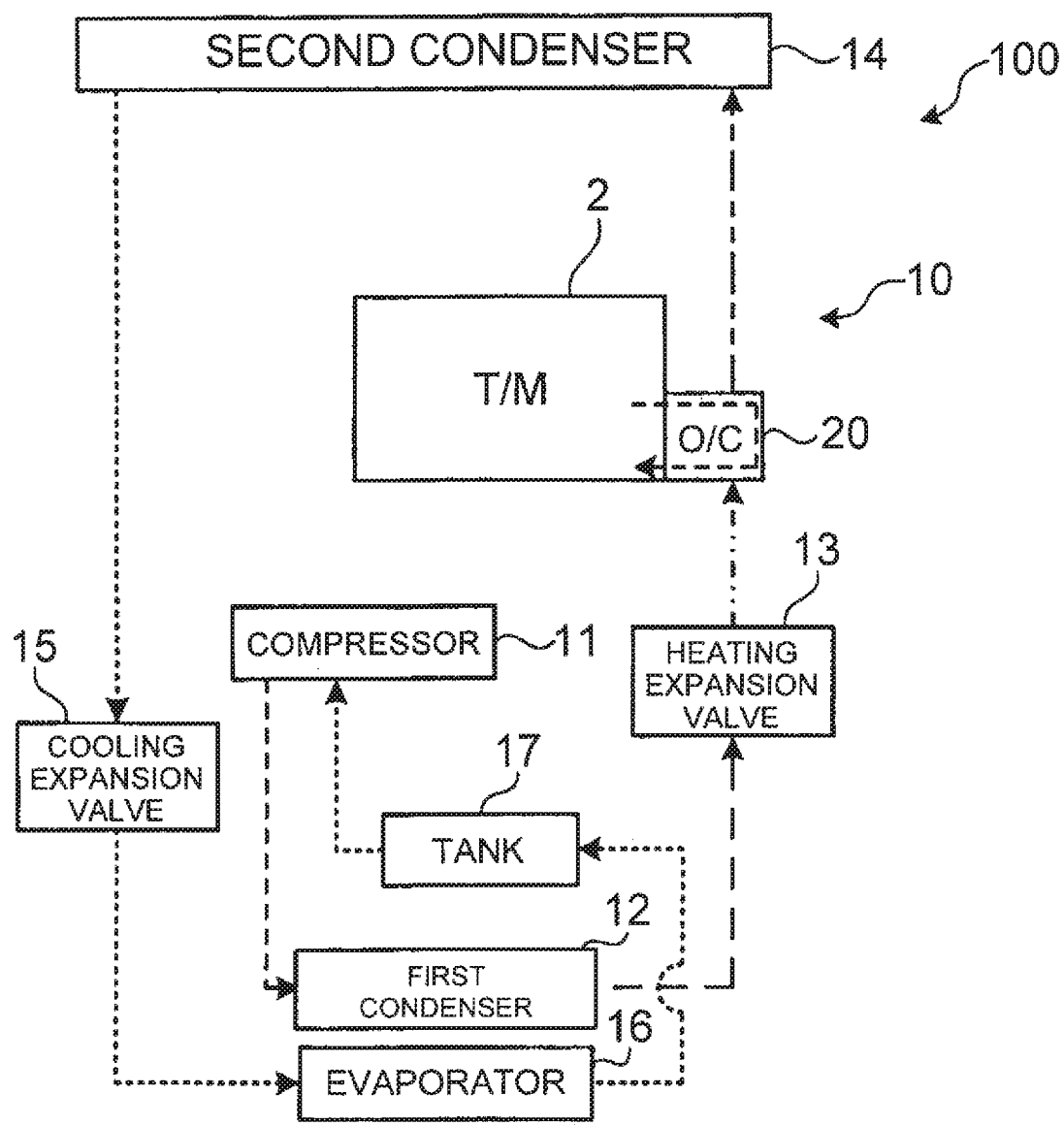
FIG. 3 is a view schematically showing a heat exchange system of a modified example of the first embodiment.

FIG. 3 is a view schematically showing the heat exchange system 100 of the modified example of the first embodiment. In the heat exchange system 100 of the modified example, the heat exchanger 20 is disposed between the heating expansion valve 13 and the second condenser 14. In the heat pump 10, the refrigerant expanded in the heating expansion valve 13 flows into the second condenser 14 after receiving heat in the heat exchanger 20. Then, the refrigerant flowing out of the second condenser 14 is supplied as is to the cooling expansion valve 15.

In this modified example, as in the first embodiment, the refrigerant in the heat absorption process during heating can be given heat not only in the second condenser 14 but also in the heat exchanger 20, which can reduce the workload of the compressor 11. During heating, the low-temperature, low-pressure refrigerant expanded in the heating expansion valve 13 is supplied to the heat exchanger 20, so that a larger amount of heat is exchanged between the refrigerant and the lubricating oil in the heat exchanger 20 owing to the larger difference in temperature therebetween. Thus, during heating, the refrigerant can receive a large amount of heat from the lubricating oil.

Second Embodiment

Figure 4:
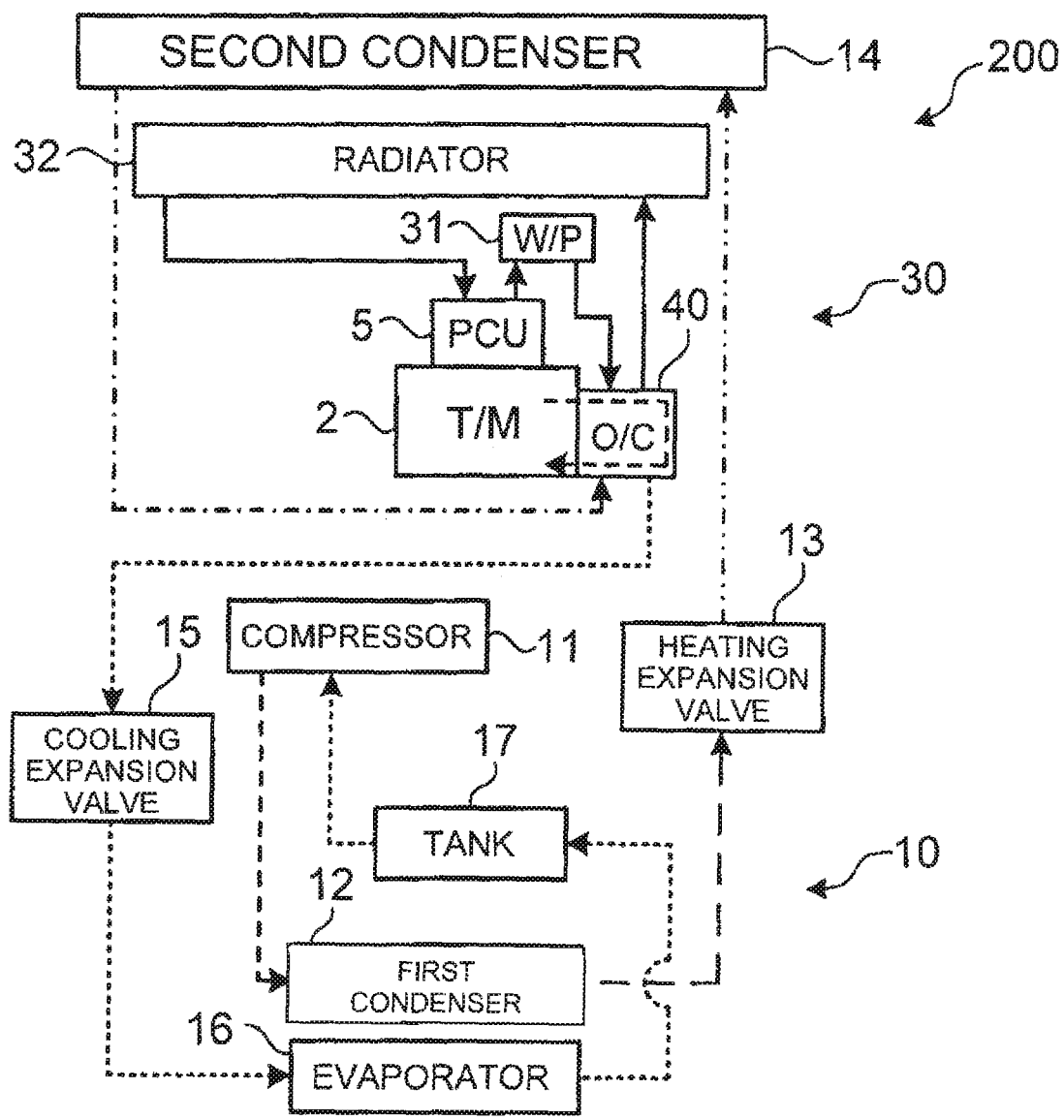
FIG. 4 is a view schematically showing a heat exchange system of a second embodiment.

FIG. 4 is a view schematically showing a heat exchange system 200 of a second embodiment. The heat exchange system 200 of the second embodiment includes a PCU cooling circuit 30 through which a coolant for cooling the PCU 5 circulates, and is configured such that heat is exchanged among three types of fluids that are the refrigerant of the heat pump 10, the lubricating oil of the transmission system 2, and the coolant of the PCU cooling circuit 30 by using a single heat exchanger 40. The heat exchange system 200 includes the heat pump 10, the PCU cooling circuit 30, and the heat exchanger 40 that exchanges heat among the refrigerant, the lubricating oil, and the coolant. In the description of the second embodiment, the same components as in the first embodiment will be denoted by the same reference signs while the description thereof will be omitted.

In the refrigerant circuit of the heat pump 10, the heat exchanger 40 is disposed between the second condenser 14 and the cooling expansion valve 15. The refrigerant flowing out of the second condenser 14 flows into the heat exchanger 40.

The heat exchanger 40 is a three-phase heat exchanger having a structure that allows heat exchange among three types of fluids that are the refrigerant of the heat pump 10, the lubricating oil of the transmission system 2, and the coolant of the PCU cooling circuit 30. The refrigerant flowing inside the heat exchanger 40 exchanges heat with the lubricating oil as well as with the coolant.

The PCU cooling circuit 30 includes a water pump (W/P) 31 and a radiator 32. The water pump 31 is an electric pump that circulates the coolant inside the PCU cooling circuit 30. The coolant discharged from the water pump 31 flows into the radiator 32 via the heat exchanger 40. Then, the coolant cooled in the radiator 32 is supplied to the PCU 5. Thus, the PCU 5 can be cooled with the low-temperature coolant.

To look at the refrigerant in the heat absorption process in the second embodiment, the refrigerant having received heat from the outside air in the second condenser 14 receives heat not only from the lubricating oil but also from the coolant in the heat exchanger 40. Thus, the gain of the specific enthalpy in the heat exchanger 40 is a sum of the heat of the lubricating oil and the heat of the coolant. When the temperature of the coolant is lower than the temperature of the lubricating oil, the lubricating oil is cooled with the coolant in the heat exchanger 40. Thus, in the second embodiment, cooling of the lubricating oil with the coolant, heat transfer of transferring the heat of the lubricating oil to the refrigerant, and heat transfer of transferring the heat of the coolant to the refrigerant, can all be performed by using the single heat exchanger 40.

As has been described above, in the second embodiment, the workload of the compressor 11 can be reduced as in the first embodiment, and heat can be exchanged among three types of fluids that are the refrigerant, the lubricating oil, and the coolant by using the single heat exchanger 40, so that a weight reduction and a cost reduction of the heat exchange system 200 can be achieved. Moreover, downsizing of the heat exchange system 200 can also be achieved, which improves the installability of the heat exchange system 200.

Like the heat exchanger 20 of the first embodiment, the heat exchanger 40 of the second embodiment may be disposed on either of the upstream side and the downstream side of the second condenser 14. As a modified example of the second embodiment, a refrigerant circuit in which the heat exchanger 40 is disposed on the upstream side of the second condenser 14 is shown in FIG. 5.

Figure 5:
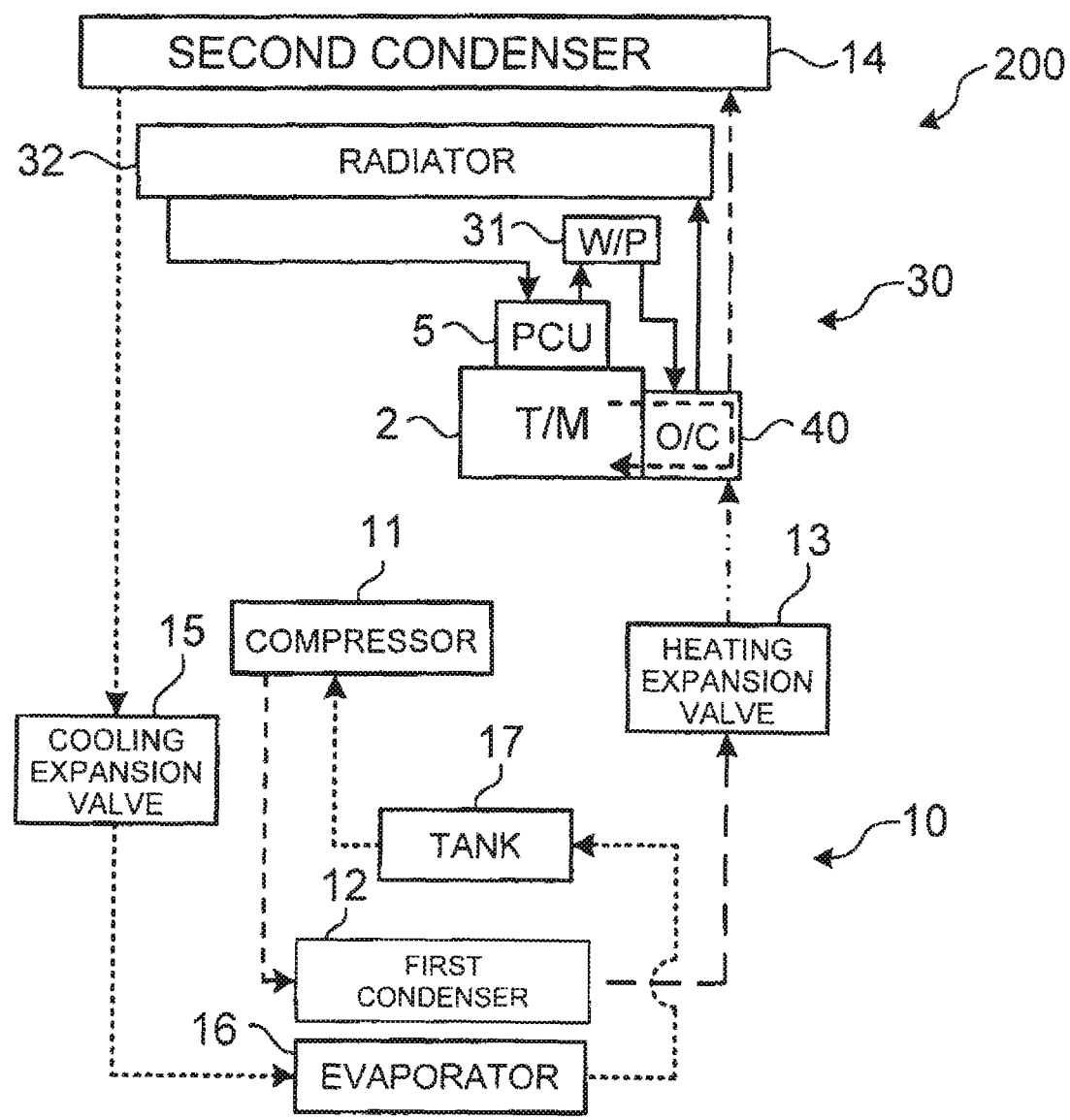
FIG. 5 is a view schematically showing a heat exchange system of a modified example of the second embodiment.

As shown in FIG. 5, in the heat exchange system 200 of the modified example of the second embodiment, the heat exchanger 40 is disposed between the heating expansion valve 13 and the second condenser 14. In the heat pump 10, the refrigerant (low-temperature, low-pressure refrigerant) expanded in the heating expansion valve 13 flows into the second condenser 14 after receiving the heat of the lubricating oil and the heat of the coolant in the heat exchanger 40. Then, the refrigerant flowing out of the second condenser 14 is supplied as is to the cooling expansion valve 15.

In this modified example, as in the second embodiment, the refrigerant in the heat absorption process during heating can not only be given heat in the second condenser 14 but also be given the heat of the lubricating oil and the heat of the coolant in the heat exchanger 40, which can reduce the workload of the compressor 11. During heating, the low-temperature, low-pressure refrigerant expanded in the heating expansion valve 13 is supplied to the heat exchanger 40, so that a larger amount of heat is exchanged between the refrigerant and the lubricating oil in the heat exchanger 40 owing to the larger difference in temperature therebetween. During heating, the refrigerant can receive a large amount of heat from the lubricating oil and the coolant.

Third Embodiment

Figure 6:
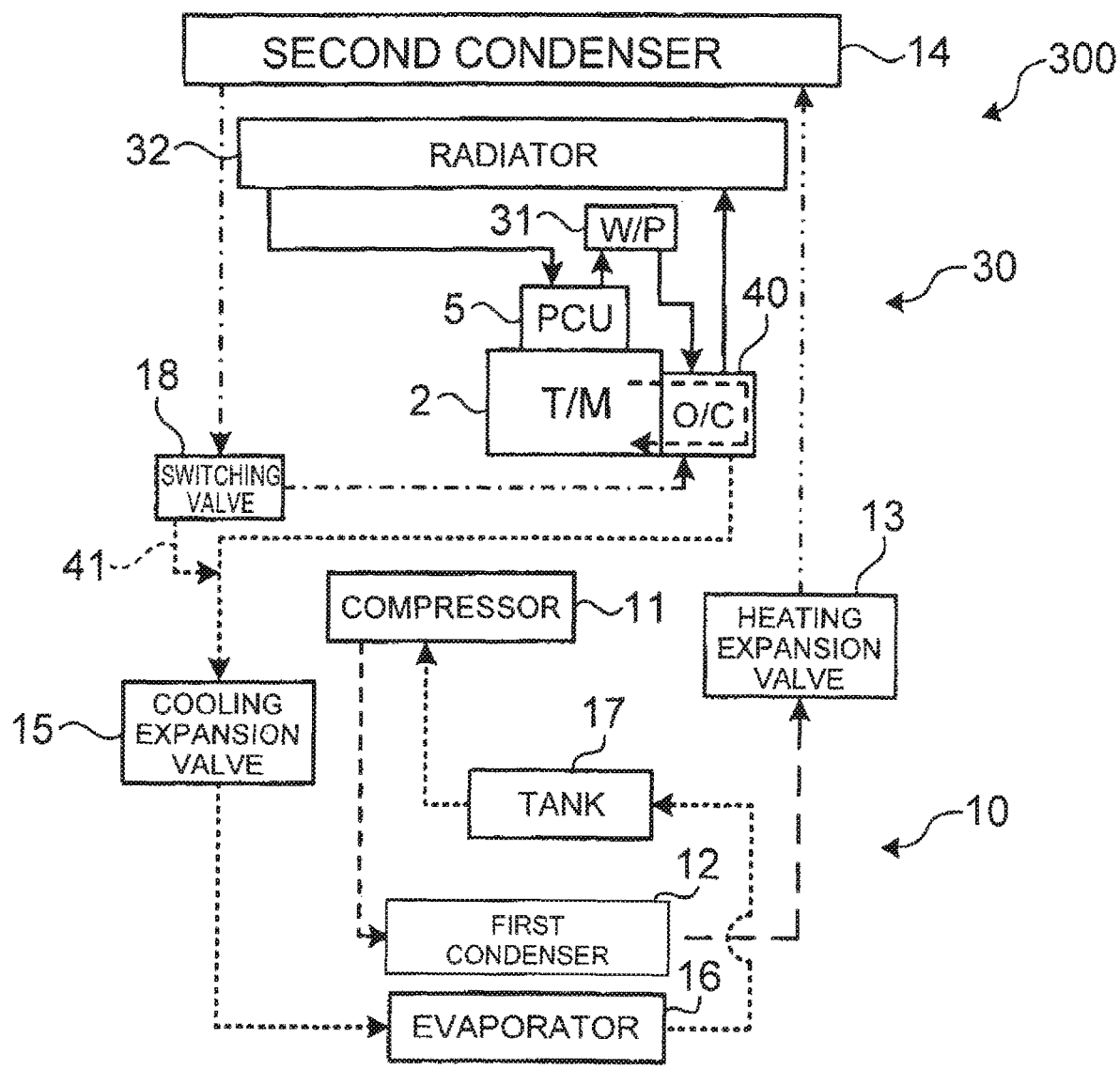
FIG. 6 is a view schematically showing a heat exchange system of a third embodiment.

FIG. 6 is a view schematically showing a heat exchange system 300 of a third embodiment. In the heat exchange system 300 of the third embodiment, a switching valve 18 that switches between a state where the refrigerant passes through the heat exchanger 40 and a state where the refrigerant bypasses the heat exchanger 40 is provided in the refrigerant circuit of the heat pump 10 of the second embodiment. In the description of the third embodiment, the same components as in the second embodiment will be denoted by the same reference signs while the description thereof will be omitted.

The heat exchange system 300 includes the heat pump 10, the PCU cooling circuit 30, and the heat exchanger 40. The refrigerant circuit of the heat pump 10 includes a heat exchange route (first route) in which the refrigerant flowing out of the second condenser 14 reaches the cooling expansion valve 15 through the heat exchanger 40, and a bypass route (second route) in which the refrigerant flowing out of the second condenser 14 reaches the cooling expansion valve 15 without passing through the heat exchanger 40. The switching valve 18 is disposed between the second condenser 14 and the cooling expansion valve 15, and operates so as to switch between the first route and the second route.

For example, the switching valve 18 has an inflow port connected to a refrigerant passage that communicates with the second condenser 14, a first outflow port connected to a supply passage that communicates with the heat exchanger 40, and a second outflow port connected to a bypass passage 41 that bypasses the heat exchanger 40. During operation of the heat pump 10, either one of the first outflow port and the second outflow port of the switching valve 18 is open. When one outflow port of the switching valve 18 is open, the other outflow port is closed. For example, when the second outflow port is open and the bypass passage 41 is open, the supply passage on the side of the heat exchanger 40 is closed. Thus, the switching valve 18 switches between opening and closing of the bypass passage 41.

During heating, the switching valve 18 closes the bypass passage 41 to establish the heat exchange route (first route) in which the refrigerant passes through the heat exchanger 40. Thus, during heating, the refrigerant in the heat absorption process can receive heat from the lubricating oil and the coolant in the heat exchanger 40.

During cooling, the switching valve 18 switches between the open state and the closed state according to whether the switching valve 18 opens or closes the bypass passage 41. When the refrigerant passes through the heat exchanger 40 during cooling, the heat of the refrigerant can be transferred to the lubricating oil and the coolant in the heat exchanger 40. When the heat of the refrigerant can be thus released in the heat exchanger 40 during cooling, a larger amount of heat is released in the heat release process than if the heat is released only in the second condenser 14, which can reduce the workload required of the compressor 11. When the refrigerant bypasses the heat exchanger 40 and flows through the bypass passage 41 during cooling, the heat of the lubricating oil and the heat of the coolant can be prevented from being transferred to the refrigerant in the heat exchanger 40. Thus, the refrigerant can be kept from being warmed in the heat exchanger 40 during cooling, so that a temperature rise of the refrigerant flowing into the evaporator 16 can be suppressed, and thereby degradation of the cooling performance can be avoided.

As has been described above, in the third embodiment, effects similar to those in the second embodiment can be achieved. Moreover, as the switching valve 18 opens the bypass passage 41 during cooling, the refrigerant can flow into the evaporator 16 without receiving heat from the lubricating oil and the coolant, so that degradation of the cooling performance can be avoided. Furthermore, the components that allow heat release in the heat release process during cooling include the heat exchanger 40 in addition to the second condenser 14, so that a larger amount of heat is released in the heat release process during cooling, which can reduce the workload required of the compressor 11.

Like the heat exchanger 40 of the second embodiment, the heat exchanger 40 of the third embodiment may be disposed on either of the upstream side and the downstream side of the second condenser 14. As a modified example of the third embodiment, a refrigerant circuit in which the heat exchanger 40 is disposed on the upstream side of the second condenser 14 is shown in FIG. 7.

Figure 7:
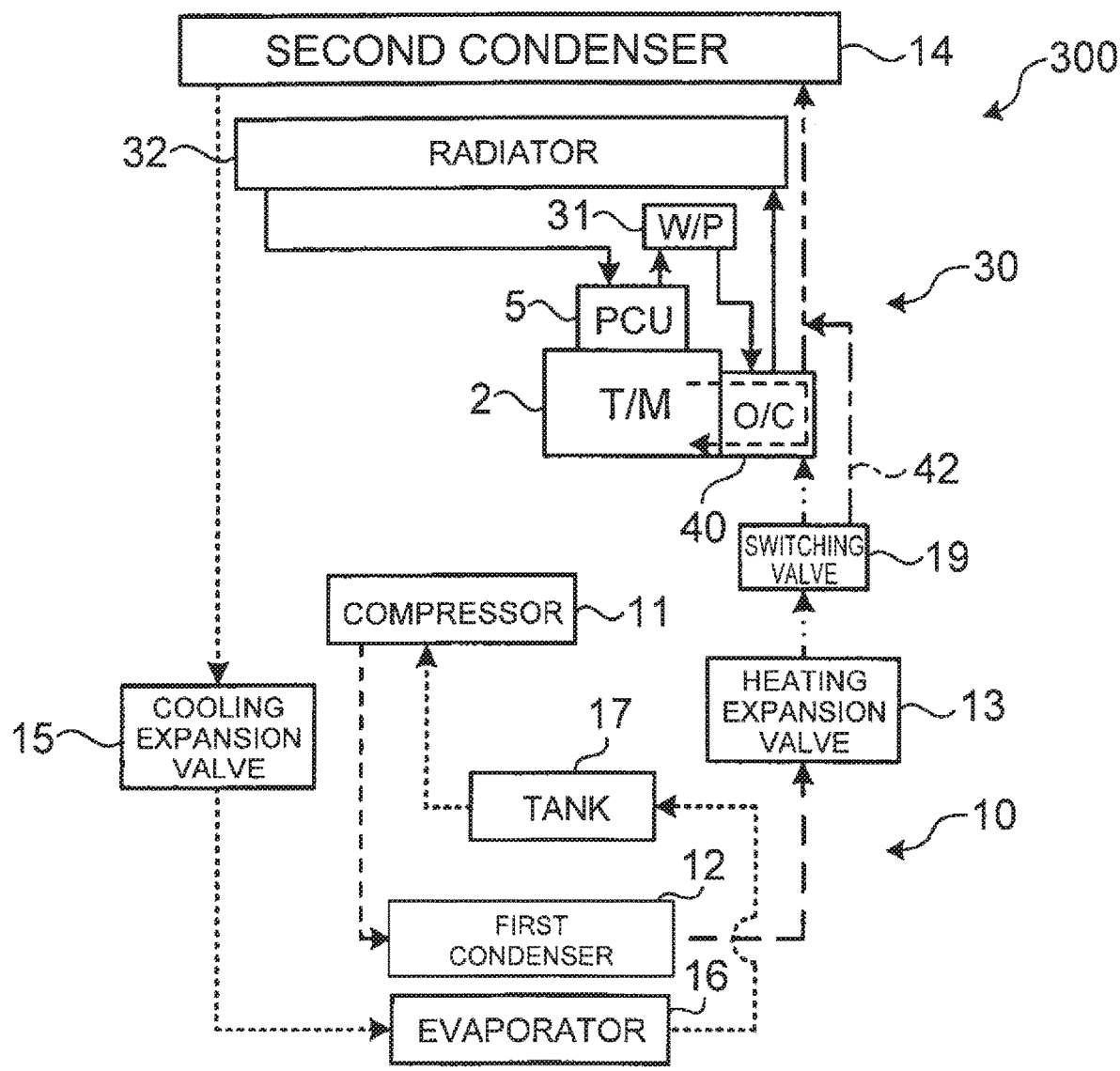
FIG. 7 is a view schematically showing a heat exchange system of a modified example of the third embodiment.

As shown in FIG. 7, the heat exchange system 300 of the modified example of the third embodiment has the heat exchanger 40 disposed between the heating expansion valve 13 and the second condenser 14, and includes a switching valve 19 that is disposed between the heat exchanger 40 and the heating expansion valve 13 and a bypass passage 42 that bypasses the heat exchanger 40. The refrigerant circuit of the heat pump 10 includes a heat exchange route (first route) in which the refrigerant compressed in the compressor 11 reaches the second condenser 14 through the heat exchanger 40, and a bypass route (second route) in which the refrigerant compressed in the compressor 11 reaches the second condenser 14 without passing through the heat exchanger 40. The switching valve 19 has an inflow port connected to a refrigerant passage that communicates with the heating expansion valve 13, a first outflow port connected to a supply passage that communicates with the heat exchanger 40, and a second outflow port connected to a bypass passage 42 that bypasses the heat exchanger 40.

In this modified example, the refrigerant supplied to the heat exchanger 40 during cooling is the high-temperature, high-pressure refrigerant compressed in the compressor 11, and therefore the temperature of the refrigerant is higher than the temperature of the lubricating oil and the temperature of the coolant. Thus, supplying this refrigerant to the heat exchanger 40 can transfer the heat of the refrigerant to the lubricating oil and the coolant. On the other hand, since a limit temperature of the lubricating oil is set as an upper limit value of a temperature range within which the transmission system 2 can normally operate, it is desirable to keep the lubricating oil from receiving heat in the heat exchanger 40 more than necessary. When the temperature of the lubricating oil is higher than a predetermined temperature during cooling, the switching valve 19 opens the bypass passage 42, so that the refrigerant bypasses the heat exchanger 40 and is supplied to the second condenser 14. When the temperature of the lubricating oil is not higher than the predetermined temperature during cooling, the switching valve 19 closes the bypass passage 42, so that the refrigerant is supplied to the second condenser 14 through the heat exchanger 40.

In this modified example, as in the third embodiment, the workload of the compressor 11 can be reduced while degradation of the cooling performance during cooling is avoided. Moreover, during cooling, the refrigerant before being cooled in the second condenser 14 can be supplied to the heat exchanger 40, so that a larger amount of heat is exchanged (a larger amount of heat is released from the refrigerant) in the heat exchanger 40, which can reduce the amount of heat released in the second condenser 14.

Fourth Embodiment

Figure 8:
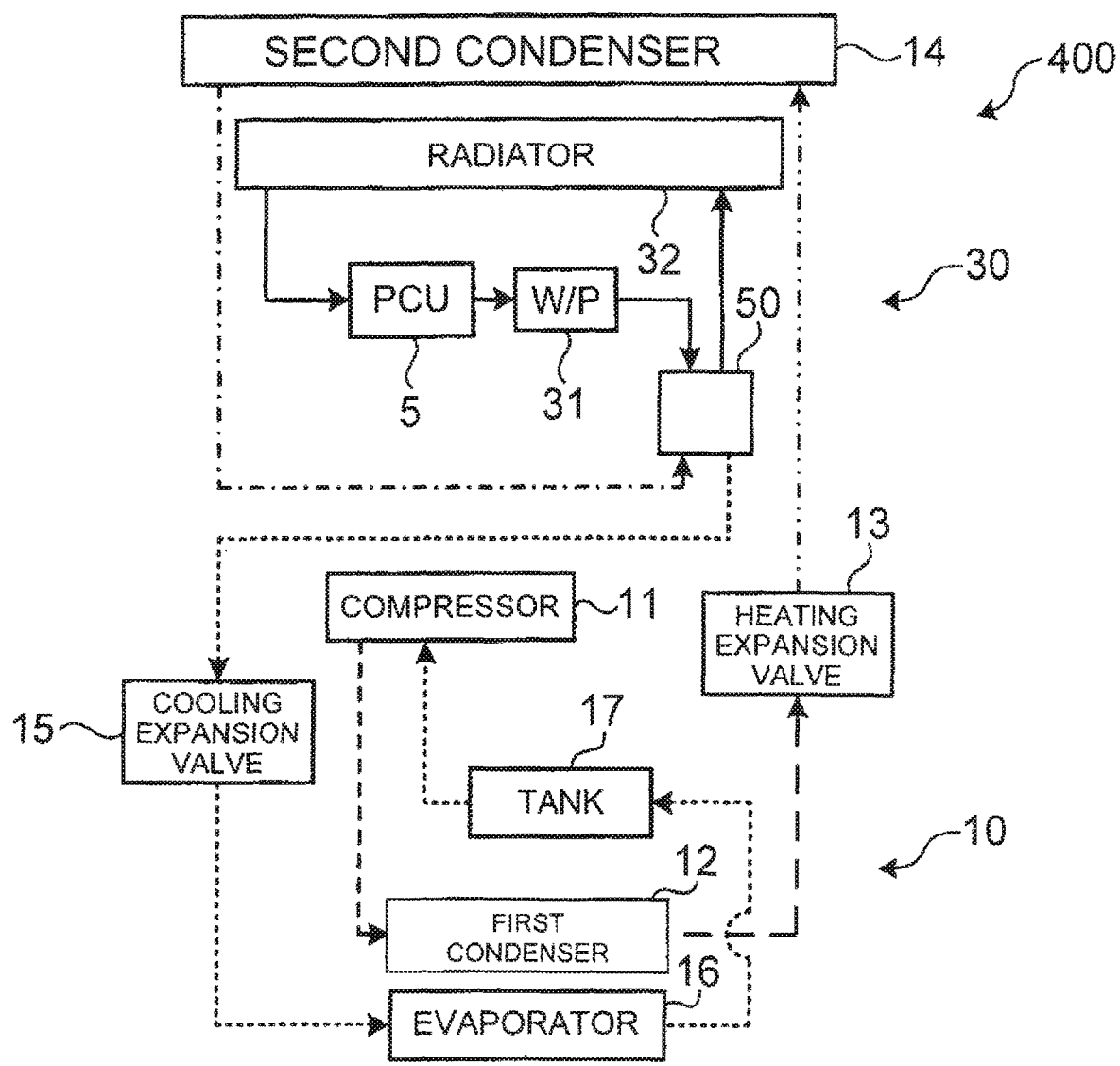
FIG. 8 is a view schematically showing a heat exchange system of a fourth embodiment.

FIG. 8 is a view schematically showing a heat exchange system 400 of a fourth embodiment. The heat exchange system 400 of the fourth embodiment includes a heat exchanger 50 that exchanges heat between the refrigerant and the coolant, in place of the heat exchanger 40 of the second embodiment. Thus, heat is exchanged between two types of fluids that are the refrigerant of the heat pump 10 and the coolant of the PCU cooling circuit 30 by using the single heat exchanger 50. In the description of the fourth embodiment, the same components as in the second embodiment will be denoted by the same reference signs while the description thereof will be omitted.

The heat exchange system 400 includes the heat pump 10, the PCU cooling circuit 30, and the heat exchanger 50. In the refrigerant circuit of the heat pump 10, the heat exchanger 50 is disposed between the second condenser 14 and the cooling expansion valve 15. The refrigerant flowing out of the second condenser 14 flows into the heat exchanger 50. The refrigerant flowing inside the heat exchanger 50 exchanges heat with the coolant.

To look at the refrigerant in the heat absorption process in the fourth embodiment, the refrigerant having received heat from the outside air in the second condenser 14 receives heat from the coolant in the heat exchanger 50. Accordingly, the gain of the specific enthalpy in the heat exchanger 50 is the amount of heat received from the coolant. Thus, in the fourth embodiment, heat transfer of transferring the heat of the coolant to the refrigerant can be performed.

As has been described above, in the fourth embodiment, as in the second embodiment, the heat of the coolant can be given to the refrigerant in the heat absorption process, which can reduce the workload of the compressor 11. As the workload of the compressor 11 is reduced, the amount of electric power consumed in the compressor 11 during heating is reduced, so that the range of the vehicle Ve can be extended.

Like the heat exchanger 40 of the second embodiment, the heat exchanger 50 of the fourth embodiment may be disposed on either of the upstream side and the downstream side of the second condenser 14. As a modified example of the fourth embodiment, a refrigerant circuit in which the heat exchanger 50 is disposed on the upstream side of the second condenser 14 is shown in FIG. 9.

Figure 9:
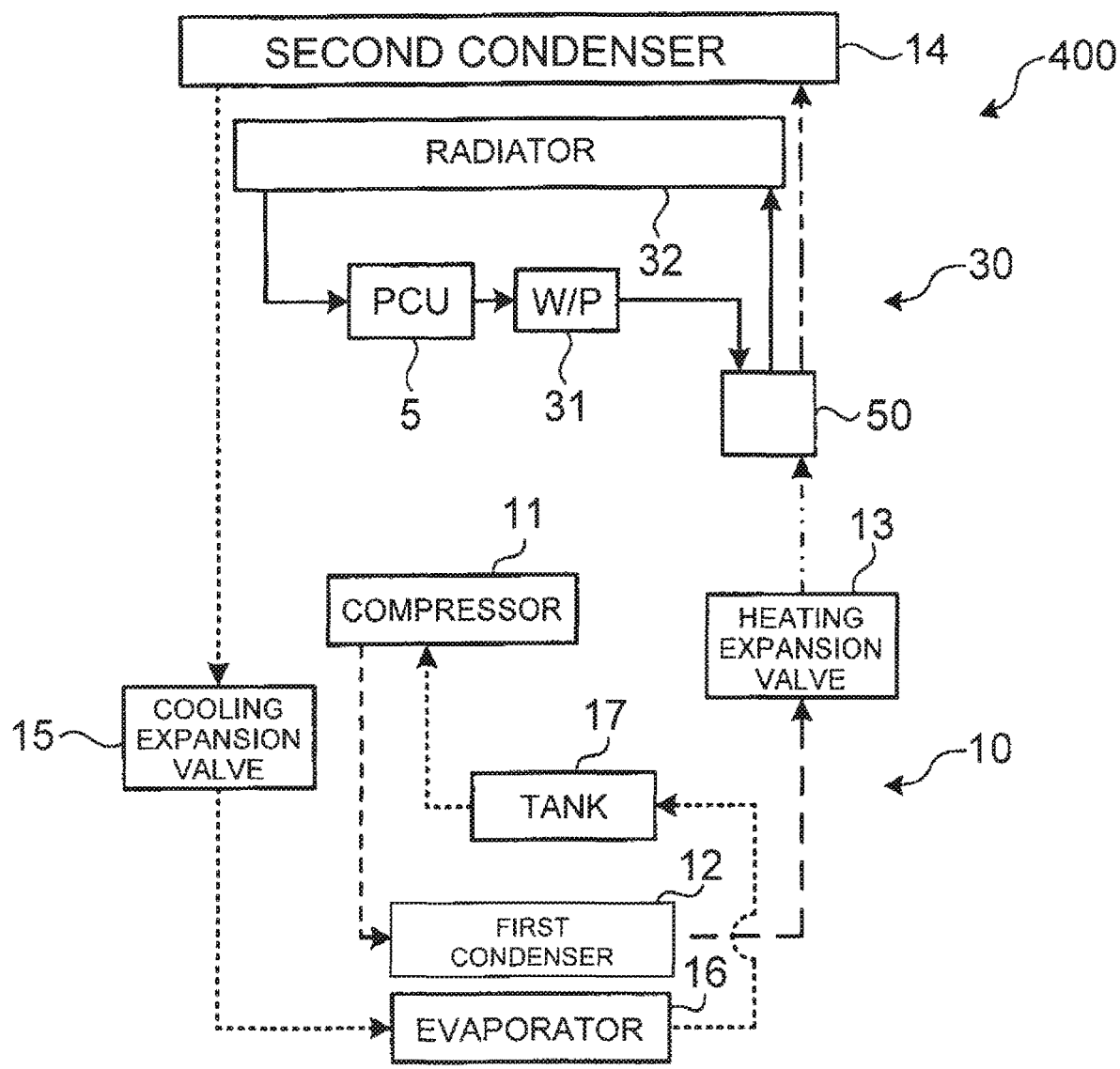
FIG. 9 is a view schematically showing a heat exchange system of a modified example of the fourth embodiment.

As shown in FIG. 9, in the heat exchange system 400 of the modified example of the fourth embodiment, the heat exchanger 50 is disposed between the heating expansion valve 13 and the second condenser 14. In the heat pump 10, the refrigerant (low-temperature, low-pressure refrigerant) expanded in the heating expansion valve 13 flows into the second condenser 14 after receiving the heat of the coolant in the heat exchanger 50. Then, the refrigerant flowing out of the second condenser 14 is supplied as is to the cooling expansion valve 15.

In this modified example, as in the fourth embodiment, the refrigerant in the heat absorption process during heating can not only be given heat in the second condenser 14 but also be given the heat of the coolant in the heat exchanger 50, which can reduce the workload of the compressor 11. During heating, the low-temperature, low-pressure refrigerant expanded in the heating expansion valve 13 is supplied to the heat exchanger 50, so that a larger amount of heat is exchanged between the refrigerant and the coolant in the heat exchanger 50 owing to the larger difference in temperature therebetween. Thus, during heating, the refrigerant can receive a large amount of heat from the coolant.

What is claimed is:

1. A heat exchange system for a vehicle including a battery, an electric motor as a propulsion power source, a transmission system, and a power control unit configured to convert electric power from the battery into an alternating current and supply the alternating current to the electric motor, the electric motor being configured to be driven with electric power supplied from the battery, the heat exchange system comprising:
    a heat pump used for air conditioning, the heat pump including an electric compressor that compresses a refrigerant, the electric compressor being configured to be driven with electric power from the battery;
    a heat exchanger configured to exchange heat between the refrigerant and lubricating oil that lubricates the transmission system, and
    a cooling circuit through which a coolant for cooling the power control unit circulates, wherein
    the heat exchanger is configured to exchange heat among three types of fluids that are the coolant, the lubricating oil, and the refrigerant.

2. The heat exchange system according to claim 1, wherein:
    the heat pump further includes a first condenser, a second condenser, a heating expansion valve configured to operate during heating performed in a vehicle cabin, and a cooling expansion valve configured to operate during cooling performed in the vehicle cabin;
    after flowing out of the electric compressor, the refrigerant flows through the heating expansion valve, the second condenser, and the cooling expansion valve in this order; and
    the heat exchanger is disposed on a downstream side of the heating expansion valve but on an upstream side of the second condenser.

3. The heat exchange system according to claim 2, wherein
    the first condenser is configured to exchange heat between air inside the vehicle and the refrigerant of the heat pump during heating performed in the vehicle cabin, and
    the second condenser is configured to exchange heat between the air outside the vehicle and the refrigerant during operation of the heat pump.

4. The heat exchange system according to claim 1, wherein:
the heat pump further includes a first condenser, a second condenser, a heating expansion valve configured to operate during heating performed in a vehicle cabin, and a cooling expansion valve configured to operate during cooling performed in the vehicle cabin;
after flowing out of the electric compressor, the refrigerant flows through the heating expansion valve, the second condenser, and the cooling expansion valve in this order; and
the heat exchanger is disposed on a downstream side of the second condenser but on an upstream side of the cooling expansion valve.

5. The heat exchange system according to claim 4, wherein
the first condenser is configured to exchange heat between air inside the vehicle and the refrigerant of the heat pump during heating performed in the vehicle cabin, and
the second condenser is configured to exchange heat between the air outside the vehicle and the refrigerant during operation of the heat pump.

6. The heat exchange system according to claim 1, wherein the heat pump further includes a bypass passage that bypasses the heat exchanger and a switching valve that opens and closes the bypass passage.

7. The heat exchange system according to claim 6, wherein the switching valve is configured to switch between an open state and a closed state according to whether the bypass passage is to be closed or opened during cooling performed in a vehicle cabin.

8. The heat exchange system according to claim 1, wherein:
the electric motor is housed inside a case that houses the transmission system; and
the lubricating oil cools the electric motor inside the case.

* * * * *